United States Patent [19]

Eguchi et al.

[11] Patent Number: 4,497,162
[45] Date of Patent: Feb. 5, 1985

[54] COMBINE HARVESTER

[75] Inventors: Jyutaro Eguchi; Shinzo Kashino; Tetsuichi Odahara; Gunzo Sukenari, all of Sakai, Japan

[73] Assignee: Kubota, Ltd., Japan

[21] Appl. No.: 458,871

[22] Filed: Jan. 18, 1983

[30] Foreign Application Priority Data

Sep. 3, 1982 [JP] Japan ................ 57-154269

[51] Int. Cl.³ .............................................. A01F 7/04
[52] U.S. Cl. .................................... 56/14.6; 130/27 P
[58] Field of Search .................. 56/14.6, DIG. 15; 130/27 F, 27 P, 27 R

[56] References Cited

U.S. PATENT DOCUMENTS

| | | | |
|---|---|---|---|
| 1,951,509 | 3/1934 | Ewing et al. | 56/14.6 |
| 2,611,227 | 9/1952 | Keller | 56/DIG. 15 |
| 2,999,347 | 9/1961 | Horne et al. | 56/14.6 |
| 3,238,949 | 3/1966 | Jarvis | 130/27 F |
| 3,247,855 | 4/1966 | Kepkay | 130/27 F |
| 3,538,689 | 9/1967 | Van Derlely | 56/14.6 |
| 3,546,860 | 12/1970 | Pool et al. | 56/DIG. 15 |
| 3,678,938 | 7/1972 | De Copne | 130/27 F |
| 4,108,150 | 8/1978 | Shaver | 130/27 H |
| 4,254,780 | 3/1981 | Powell et al. | 56/14.6 |
| 4,265,077 | 5/1981 | Pegers | 56/14.6 |

FOREIGN PATENT DOCUMENTS 246009 12/1962 Australia ............ 130/27 F

Primary Examiner—Paul J. Hirsch
Attorney, Agent, or Firm—Cushman, Darby & Cushman

[57] ABSTRACT

A combine harvester of directly-streamed type wherein a thresh/selection apparatus (3) and a manipulation quarter (4) are mounted on a vehicle framing (2) equipped with running travel means (1) thereunder; in such configuration of left and right juxtaposition as to enable their snug accommodation within the reaping width of the havester; an engine (26) is mounted, rearwardly of the said manipulation quarter (4), on to the said vehicle framing (2); and a lower portion of a said grain-tank (6) is disposed, at a position directly rearwardly of beater means (21), in a manner as to protrude into a front end upper portion of a selecting section (3b) with a strawwalker (22).

2 Claims, 6 Drawing Figures

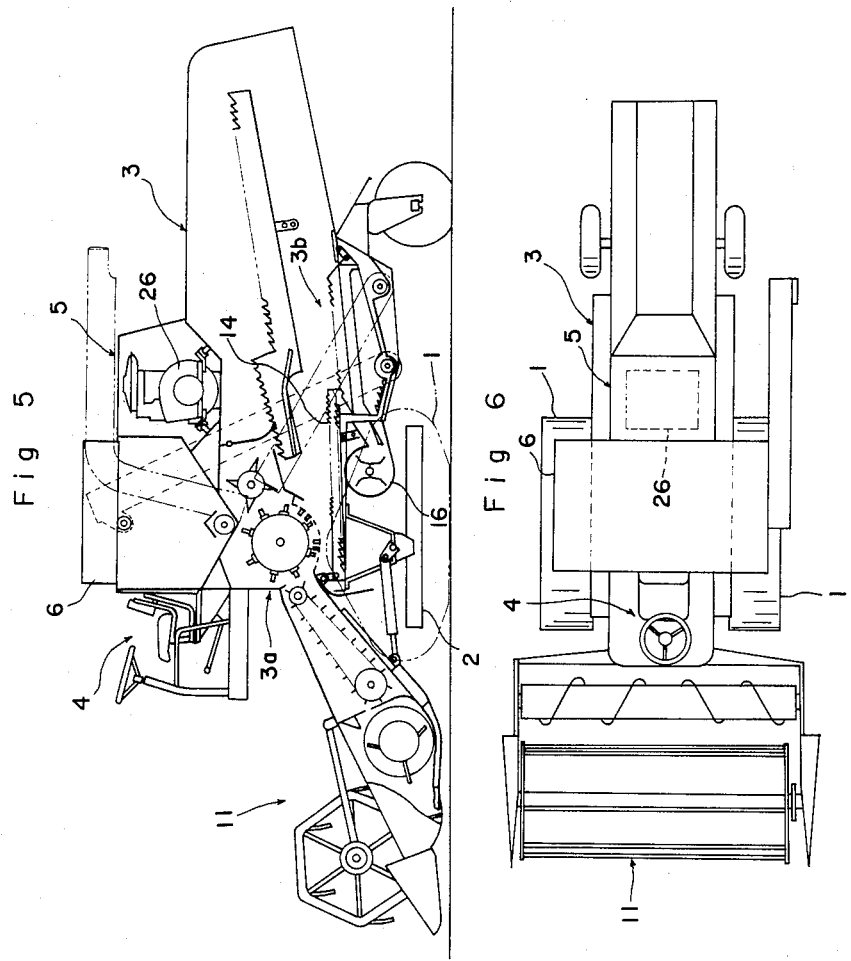

COMBINE HARVESTER

BACKGROUND OF THE INVENTION (1) Field of the Invention

This invention relates to improvements in a combine harvester of a rotary-type, and in particular to a combine harvester of rather small size, wherein planted grain stalks are reaped by a reaping/pretreating apparatus and then fed by a conveyor to a threshing section of a thresh/selection apparatus. The goods which pass through the threshing section are fed to a chaff-sieve for rocking selection thereon. The thus selected grains are transferred to and withdrawn in a grain tank disposed on and above the thresh/selection apparatus, while the goods left over without passing through the threshing section are forced, by beater means, to be fed to a rearward strawwalker for rocking selection thereon.

(2) Description of the Prior Art

Conventional combine harvesters of the above-mentioned rotary-type have in general been constructed, but are typically rather large in size having a considerable reaping width (say 2.5 m and more). The large size is to stabilize the vehicle by lowering its overall height or, more particularly, its center of gravity, and also to render the vehicle more compact. As shown in FIGS. 5 and 6, a thresh/selection apparatus (3) extending the entire transverse width of the vehicle is mounted on a vehicle frame (2) equipped with a pair of left and right running-travel apparatuses (1), (1) such as a crawler or the like. A manipulation quarter (4) is disposed on a front end upper portion of the thresh/selection apparatus (3) at a left-and-right center portion while a grain-tank (6) is disposed at a position rearwardly of the manipulation quarter (4) and on and above a threshing section (3a) of the thresh/selection apparatus (3). A prime-mover section (5), consisting of an engine (26) is disposed at a position rearwardly of the grain-tank (6) and on and above a selecting section (3b) of the thresh/selection apparatus (3). A part of the various apparatuses constituting the thresh/selection apparatus (3), such as a rockingly transferring apparatus (14) which rearwardly transfers thresh-treated goods from the threshing section (3a), a winnower (16) which supplies selection-wind to the selecting section (3b) for wind-separation, and so forth, are disposed in a manner of sinking them down in between the left and right running-travel apparatuses (1). However, if it is desired to construct such a machine of rather small size, of comparatively narrow reaping width (say 2 m and less), the disposition of the thresh/selection apparatus (3) (e.g. the rockingly transferring apparatus (14), the winnower (16) and so forth), by lowering it in between the left and right running-travel apparatuses (1), (1), then becomes impractical because it is impossible to provide sufficiently ample spacing interval of the left and right running-travel apparatuses (1), (1). Thus, if the disposition or arrangement of the large-sized machine as mentioned above is simply applied to a small-sized combine harvester of the directly-streamed type, it is necessary to increase the height of the vehicle in comparison with the vehicle width which thus decrease vehicle stabilization and moreover, does to provide a compact vehicle, which is particularly desired in small-sized machine types.

SUMMARY OF THE INVENTION

In view of the actual status of the prior art as mentioned above, this invention has as its object, in the rotary-type combine harvester of rather small size, to lower the vehicle height in the intention of realizing stabilization and increasd compactness of the vehicle, by a rational arrangement of the thresh/selection apparatus, manipulation quarter, grain tank and prime-mover section, in a planar manner, all above the vehicle framing.

A characteristic construction of this invention consists, in the combine harvesters of the rotary type mentioned at the beginning, in that the thresh/selection apparatus and a manipulation quarter are mounted on a vehicle frame equipped with running-travel means thereunder in left and right juxtaposition so as to enable their snug accommodation within the reaping width of the vehicle. An engine is mounted rearwardly of the said manipulation quarter onto the vehicle frame a lower portion of the grain tank is disposed at a position directly rearwardly of the beater means in such a manner as to protrude into a front end upper portion of a selecting section with the strawwalker.

Due to this rational planar arrangement by means of providing the thresh/selection apparatus and the manipulation quarter in the left and right juxtaposition on the vehicle framing so as to enable snug accommodation of their overall transverse width size within the reaping width, and of mounting the engine on the vehicle framing in good use of void space above the vehicle framing due to such an arrangement, rearwardly of the manipulation quarter and laterally of the thresh/selection apparatus, it has now become possible to lower the overall height of the essential portions of the vehicle and, in particular, to remarkably lower the center of gravity of the vehicle without disposing a part of the thresh/selection apparatus between the left and right running-travel means. By disposing a lower portion of the grain tank in a front end upper portion of the strawwalker of the selecting section, directly rearwardly of the beater means of the threshing section, as to protrude thereinto, it has now become possible to lower the maximum height of the vehicle and to further lower the center of gravity of the vehicle as well, in comparison with harvesters having a grain tank on and above the selecting section. It is thus now possible to provide a combine harvester of a rotary type, which is extremely stable and compact as is particularly desired in small-sized machine types.

Still further objects and merits of this invention will be apparent from the detailed description to follow hereinafter.

BRIEF DESCRIPTION OF THE DRAWINGS

The drawings show, by way of example, an embodiment of the combine harvester of rotary type, according to this invention, as well as a conventional example; wherein

FIG. 5 is an overall side elevation, in section, of a conventional vehicle; and

FIG. 6 is an overall plan view of the same conventional vehicle.

DESCRIPTION OF THE PREFERRED EMBODIMENT

Figure 1:
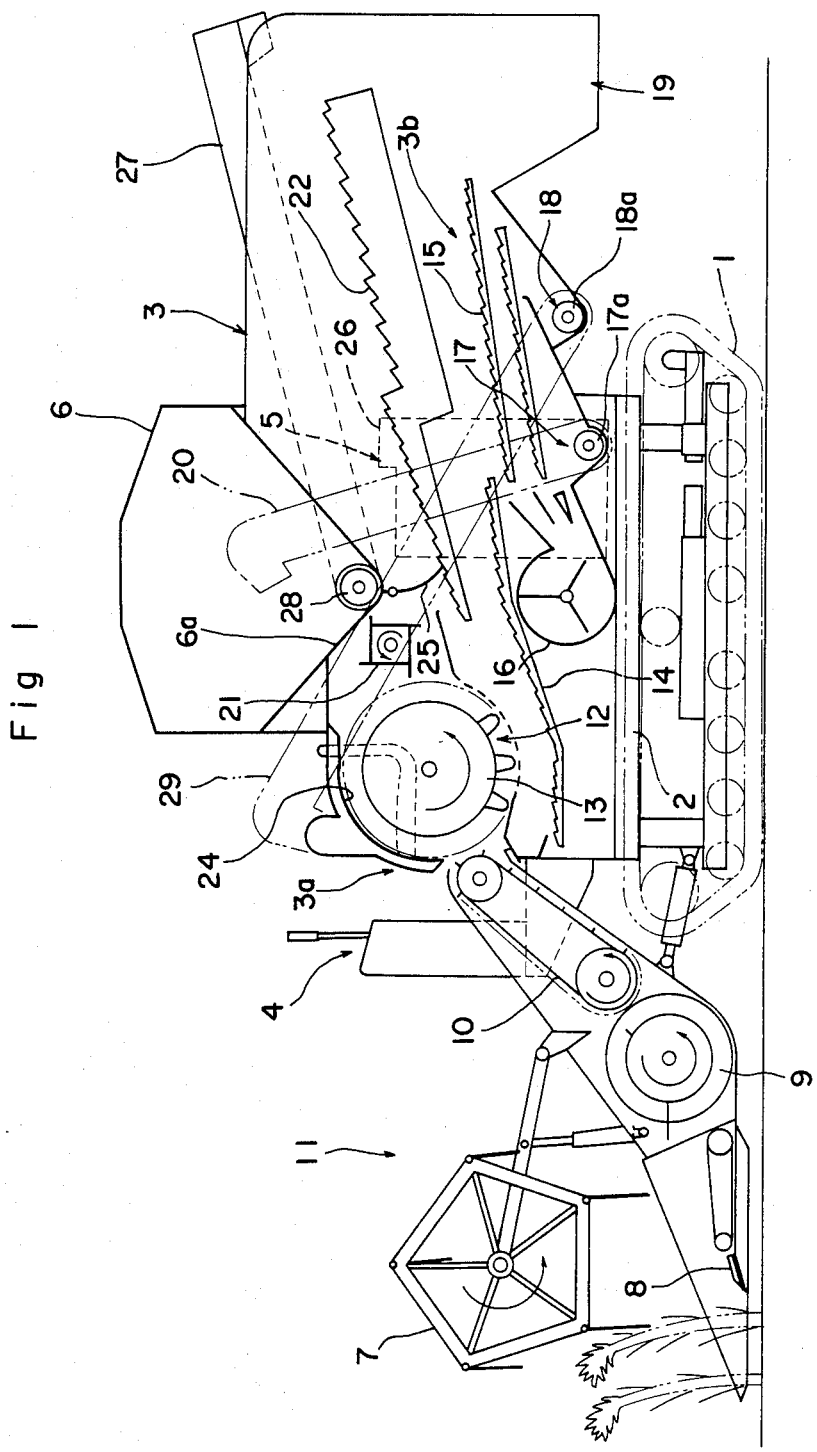
FIG. 1 is an overall side elevation, in section.
Figure 2:
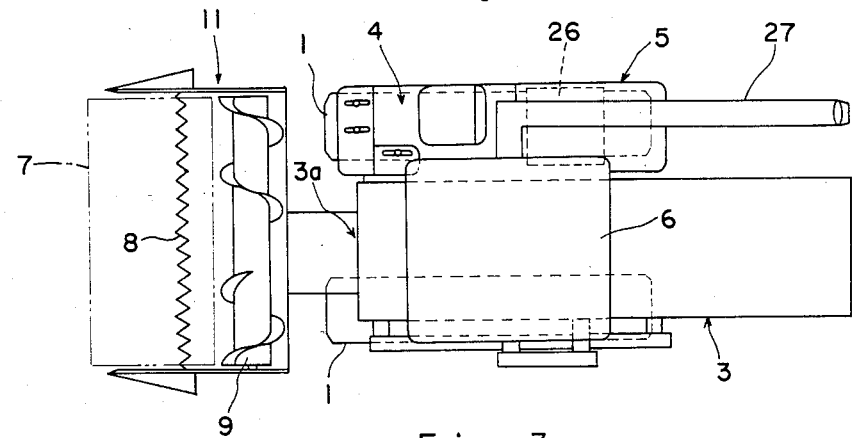
FIG. 2 is an overall plan view of the same vehicle.

A rotary-type combine harvester as shown in FIGS. 1 and 2 is adapted to reap and thresh grain stalks and to withdraw and store thusly threshed grains while traveling over the fields. For this purpose there is provided such that on a vehicle framing (2) equipped with a pair of left and right crawler type running-travel means (1) and an automatic thresh/selection apparatus (3) and A riding manipulation quarter (4), a prime-mover section (5), and a grain-tank (6) for withdrawing and storing the threshed grains are also provided. On a front end portion of the vehicle framing (2) there is provided, for arbitrary raising and lowering maneuvering by power, a reaping/pretreating apparatus (11) consisting of a reel (7) which rakes-in planted upstanding grain stalks on the field, a reaping apparatus (8) which reaps thusly raked-in stalks, an auger (9) which gathers together thusly reaped grain stalks widthwise or in the transverse direction of the vehicle, and a conveyor (10) which transfers and feeds the grain stalks from the auger (9) to a threshing section (3a) of the automatic thresh/selection apparatus (3).

Figure 3:
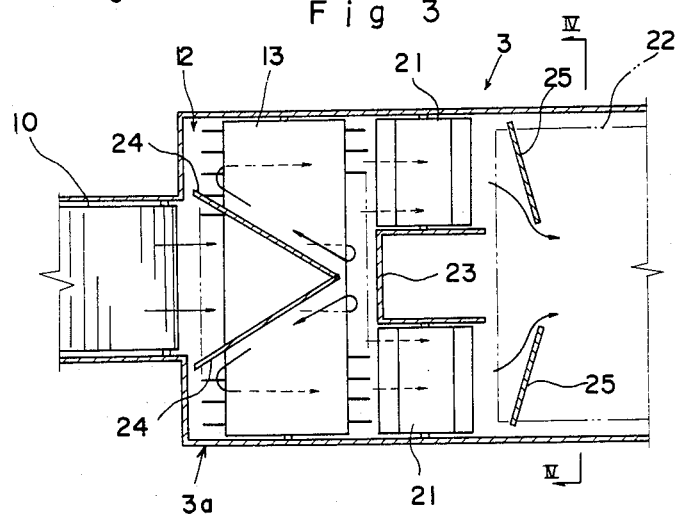
FIG. 3 is a plan view, in section, of its threshing section.

Now, description is first given generally on the automatic thresh/selection apparatus (3), with reference to FIGS. 1-3. As is seen, the grain stalks as transferred and fed by means of the conveyor (10) are subjected, within a threshing chamber (12), to the rotary threshing treatment by means of a threshing drum (13). The goods fed from the threshing chamber (12) upon the treatment pass therethrough and drop down and are transferred to a rearward selecting section (3b) by means of a rockingly transferring apparatus (14). In the selecting section (3b), the treated goods are subjected to rocking gravitational selection by means of a chaff-sieve (15) and also to wind-separation or winnowing by means of wind created by a fan (16). Thusly selected first run goods and the second run goods are withdrawn in a first-run-good withdrawal section (17) and a second-run-goods withdrawal section (18), respectively. Waste straws after such selection treatment are discharged to the outside of the vehicle through a dust-discharge outlet (19). The the thusly withdrawn first run goods are also transferred and fed to the grain-tank (6) for storage, via a transverse transfer screw apparatus (17a) and an upright conveyor (20), while the thusly withdrawn second run goods are returned to the threshing chamber (12) via a transverse transfer screw apparatus (18a) and a conveyor apparatus (29) for second-run-goods-returning. On the other hand, the goods occurring in the treatment which contain comparatively long straw wastes after the threshing treatment step are raked out rearwards from the threshing chamber (12), the rotating action of the threshing drum (13) and rotating action of beater means (21) disposed rearwardly of the threshing chamber (12), and are fed to a front end portion of a strawwalker disposed above the selecting section (3b). While the treatment goods are rockedly transferred rearwards by means of the strawwalker (22), retained grains drop down therethrough onto the chaff-sieve (15) therebelow. Ultimately the waste straws are discharged to the outside of the vehicle through the dust-discharge outlet (19).

Description is now given in further detail on the treating transfer lines in the threshing section (3a), with reference to FIG. 3. The transfer terminal end portion of the conveyor (10) of the reaping/pretreating apparatus (11) is disposed to face a left-and-right central portion of the threshing chamber (12), to thus feed the reaped grain stalks to the left-and-right central portion of the threshing chamber (12). In the left-and-right central portion of the threshing chamber (12) there is disposed a threshing-object-goods-turning-over wall (23) adapted to guide, in cooperation with rotating transfer action of the threshing drum (13), the threshing-object-goods as are moved in rearward transfer underneath the threshing drum (13) along the threshing-drum (13) outer peripheral shape by the rotating action of the threshing drum (13) itself, to above the threshing drum (13) along the outer peripheral shape of the threshing drum (13). A pair of slant guide plates (24) are provided on the inner surface of the threshing chamber (12) upper wall, in continuation thereto, and are adapted so as to dividingly guide both front end portion outer lateral sides within the threshing chamber (12), located on both transverse outer sides of the transfer terminal end of the conveyor (10). The threshing-object-goods are guided above to the threshing drum (13) and are transferred by means of the rotating transfer action of the threshing drum (13) towards the front end portion of the threshing chamber (12). Further, a pair of the beater means (21), adapted to act on the thresh-treated goods which have been rearwardly transferred underneath the threshing drum (13) in both lateral portions of the threshing chamber (12), in a raking-out rotating action rearwards of the threshing chamber (12), are disposed, on both lateral sides of the turning-over wall (23), in between the threshing chamber (12) and the strawwalker (22) front end portion. The overall structure is thereby constructed so as to provide quite long treatment lines of the goods being threshed within the threshing chamber (12), thus the reaped grain stalks as fed by means of the conveyor (10); by effectively utilizing, to the practical utmost, the cylindrical shape of the threshing drum (13) as well as the transverse width size of the threshing chamber (12), enhances the threshing treatment capacity.

Figure 4:
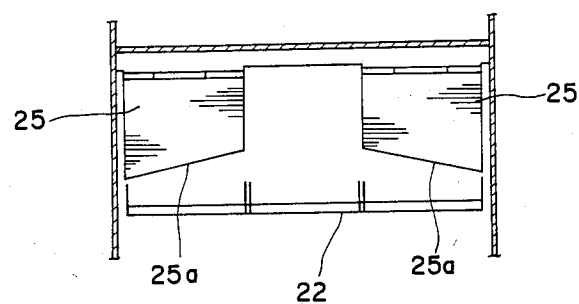
FIG. 4 is a sectional view on a transverse plane shown at IV—IV in FIG. 3.

Further construction is provided, as may be referred to FIGS. 1, 3 and 4, such that a pair of left and right hanging screens (25) made of rubber, are disposed rearwardly of the left and right beater means (21) and above a front end portion of the strawwalker (22). Each screen 25 defines a lower slant hem (25a), which are slant relative to one another the higher portion nearer the left-and-right center of the strawwalker (22). Screens 25 are rearwardly slant, as viewed in a plan, so that the rear portions thereof are nearer the left-and-right center of the strawwalker (22) than the forward portions. The treated goods which have been raked out and fed by means of the beater means (21) to both front end lateral side portions of the strawwalker (22), are thus uniformly dispersed also to the left-and-right central portion of the strawwalker (22) front end portion which is located rearwardly of the turning-over wall (23) due to the slanted receiving action, as viewed in a plan view, of both the hanging screens (25) imported to the goods by and the action of their lower slant hems (25a).

Description is given hereunder in further detail on the overall arrangement or configuration of this rotary-type combine harvester. As shown in FIGS. 1 and 2, the automatic thresh/selection apparatus (3) and riding manipulation quarter (4) are mounted on the vehicle framing (2) in such configuration of the vehicle-leftand-right juxtaposition as their overall transverse width size finds snug accommodation within the reaping width size of the reaping/pretreating apparatus (11) and also in such manner that the manipulation quarter (4) is disposed somewhat near the vehicle framing (2) front end. The prime-mover section (5), consisting of an engine (26) and forth, is so disposed on the vehicle framing (2) rearwardly of the manipulation quarter (4) and transversely laterally of the thresh/selection apparatus (3). The grain-tank (6) is made with its bottom wall (6a) having a V-shaped (as viewed in sectional side elevation) with its open mouth upwards in order to provide therewithin a discharge screw apparatus (28) adapted to transversely send and feed the grains within the grain-tank (6) to a grain-discharge tube (27) when discharging the grains to the outside of the vehicle. The grain tank (6) moreover is disposed on and above the thresh/selection apparatus (3) in such manner that the lowermost position of the bottom wall (6a) enters (as viewed in a side elevation) into a space located directly rearwardly of both the beater means (21) and above the front end portion of the strawwalker (22). The grain-discharge tube (27) is disposed to extend to the rear of the vehicle from a position rearwardly of the manipulation quarter (4), passing over and above the engine (26).

The vehicle is thus constructed so as to lower the height of the essential vehicle components and in particular to remarkably lower the center of gravity of the vehicle by the said rational disposition, in a planar manner, of the thresh/selection apparatus (3), the manipulation quarter (4) and the prime-mover section (5), above the vehicle framing (2). Also the above construction lowers the maximum height and the center of gravity of the vehicle as well, by the providing a lower portion of the grain-tank (6) that it protrudes into a space located above a front end portion of the strawwalker (22), directly rearwardly of the beater means (21). Thus, the stability of the vehicle is remarkably enhanced and also a much more compact vehicle is realized.

As to ratios of the areas, as viewed in a plan view, as occupied by the thresh/selection apparatus (3), the manipulation quarter (4) and the prime-mover section (5), as disposed on the vehicle frame (2) in planar manner, it is possible to widely alter them in accordance with various modifications of their structure. It is further possible, in more detail, to quite arbitrarily select and adopt any local combination as to which one of the adjoining members to dispose over and above the other in each of such overlapping adjoining portions.

It further is possible to select and adopt quite a variety of specific structure of the grain-tank (6) and of the support on to the vehicle, as to the way how to actually dispose a lower portion of the grain-tank (6) to protrude, rearwardly of the beater means (21), into a front end upper portion of the selecting section (3b) with the strawwalker (22); and in consequence thereof it is possible, still further, to adopt various modifications as to the specific degree of said protrusion of the lower portion of the grain-tank (6), and so forth.

This invention has, as its object matter, the combine havesters of directly-streamed type having quite a variety of structure or configuration, equipped with various kinds of running-travel means as of crawler type, wheel type and so forth.

We claim:

1. A rotary-type combine harvester comprising traveling means permitting said harvester to travel over ground:
   a harvester frame mounted on said traveling means;
   reaping and pretreating means carried forwardly by said fame;
   threshing and separating means including a threshing drum, beater means and a straw walker, said threshing and separating means mounted at a transversely offset position on said frame;
   a driver's section disposed parallel to and in a side-by-side relationship with said threshing and separating means;
   an engine attached directly to said frame rearwardly of said driver's section and having a transverse dimension substantially equal to a transverse dimension of said driver's section;
   a grain tank disposed above said threshing and separating means and including a grain discharge pipe; wherein
   a transverse dimension of said threshing and separating means and the transverse dimension of said driver's section added together substantially equal to a transverse dimension of said reaping and pretreating means; and wherein
   said grain tank includes a lower part having a V-shaped section extending into a space between said better means and a straw walker in said threshing and separating means such that a lower end of said grain tank is disposed below tops of said threshing drum of said threshing and separating means and said beater means.

2. A combine harvester as claimed in claim 1 wherein said grain discharge pipe extends from said grain trank transversely toward said driver's section and then rearwardly through a space above said engine, said grain discharge pipe having a top level with or below a top of said grain tank.

* * * * *